United States Patent [19]

Fischer et al.

[11] 4,405,696

[45] Sep. 20, 1983

[54] ELECTROCHEMICAL STORAGE CELL

[75] Inventors: Wilfried Fischer, Neckargemünd; Dieter Hasenauer, Weinheim, both of Fed. Rep. of Germany

[73] Assignee: Brown, Boveri & Cie AG, Mannheim, Fed. Rep. of Germany

[21] Appl. No.: 370,662

[22] Filed: Apr. 22, 1982

[30] Foreign Application Priority Data

May 2, 1981 [DE] Fed. Rep. of Germany ....... 3117384

[51] Int. Cl.³ .......................................... H01M 10/39
[52] U.S. Cl. .................................... 429/104; 429/193
[58] Field of Search ............................... 429/104, 193

[56] References Cited

U.S. PATENT DOCUMENTS 3,932,195  1/1976  Evans et al. ........................ 429/104
4,091,151  5/1978  Minck ................................. 429/104
4,206,272  6/1980  Fischer et al. ...................... 429/104
4,220,692  9/1980  Hunt ................................... 429/104

*Primary Examiner*—Donald L. Walton
*Attorney, Agent, or Firm*—Herbert L. Lerner; Laurence A. Greenberg

[57] ABSTRACT

Electrochemical storage cell based on alkali metal and chalcogen comprising at least one anode space for the alkali metal anolyte and a cathode space for the chalcogen catholyte, with the anode space and the cathode space separated from each other by an alkali ion-conducting solid electrolyte wall and a metallic housing bounding the cell. The solid electrolyte wall has a plurality of spaced, outwardly extending hollow recesses, and at least one current collector disposed between each pair of adjacent recesses.

31 Claims, 3 Drawing Figures

ELECTROCHEMICAL STORAGE CELL

BACKGROUND OF THE INVENTION

1. Field of the Invention

The invention relates to an electrochemical storage cell of the alkali metal and chalcogen type with at least one anode space for receiving the anolyte, and one cathode space for receiving the catholyte, which are separated from each other by an alkali ion-conducting solid electrolyte and are bounded, at least in some places, by a metallic housing.

2. Description of the Prior Art

Such rechargeable electrochemical storage cells with a solid electrolyte are highly suited for constructing storage batteries with high energy and power density. The solid electrolytes used in the alkali-chalcogen storage cells use solid electrolytes, made for instance of $\beta$-aluminum oxide, which are distinguished by the fact that the partial conductivity of the mobile ions is very high and the partial conductivity of the electrons is several powers of ten smaller. By using such solid electrolytes for constructing electrochemical storage cells practically no self-discharge takes place since the electron conductivity is negligible and the reaction substances cannot get through the solid electrolyte as neutral particles.

A specific example for such rechargeable electrochemical storage cells are those of the sodium and sulfur type, the solid electrolyte of which is made of $\beta$-aluminum oxide. It is an advantage of this electrochemical storage cell that no secondary electrochemical reactions occur during the charging. The reason for this is again that only one kind of ions can get through the solid electrolyte. The current yield of such a sodium-sulfur storage cell is, therefore, near 100%. In these electrochemical storage cells, the ratio of energy content to the total weight of such a storage cell is very high as compared to lead storage batteries, because the reaction substances are light and much energy is released in the electrochemical reaction.

The electrochemical storage cells of this design, however, have the disadvantage that the solid electrolyte can break if too high a voltage is applied to the storage cells. Aging or mechanical damage of the solid electrolyte can also lead to their fracture. As a consequence, sodium and sulfur flow together and react directly with each other. This results in a large temperature rise of the storage cell, so that in the worst case the destruction of the cell housing or an explosion can come about.

From German Published Non-Prosecuted Application DE-OS No. 25 51 604, an electrochemical storage cell is known which is provided with a safety insert which is supposed to prevent the confluence of sodium and sulfur. This safety insert has the disadvantage that the solid electrolyte can have only a simple geometry, and also must be designed as a tube closed on one side. This limits the power density of the storage cell. Since such a safety insert must practically have the same area as the solid electrolyte, the weight contribution of the safety insert is no longer negligible as compared to the total of weight of the storage cell, which again diminished the power density and the energy density of such a storage cell.

SUMMARY OF THE INVENTION

It is, therefore, an object of the invention to provide a storage cell in which if the solid electrolyte breaks, the confluence of larger amounts of sodium and sulfur is prevented and which nevertheless has a high power and energy density.

With the foregoing and other objects in view, there is provided in accordance with the invention an electrochemical storage cell based on alkali metal and chalcogen comprising at least one anode space for the alkali metal anolyte and a cathode space for the chalcogen metal catholyte, with the anode space and the cathode space separated from each other by an alkali ion-conducting solid electrolyte wall, a metallic housing bounding the cell, said solid electrolyte wall having a plurality of spaced, outwardly extending hollow recesses, and at least one current collector disposed between each pair of adjacent recesses.

Other features which are considered as characteristic for the invention are set forth in the appended claims.

Although the invention is illustrated and described herein as embodied in an electrochemical storage cell, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
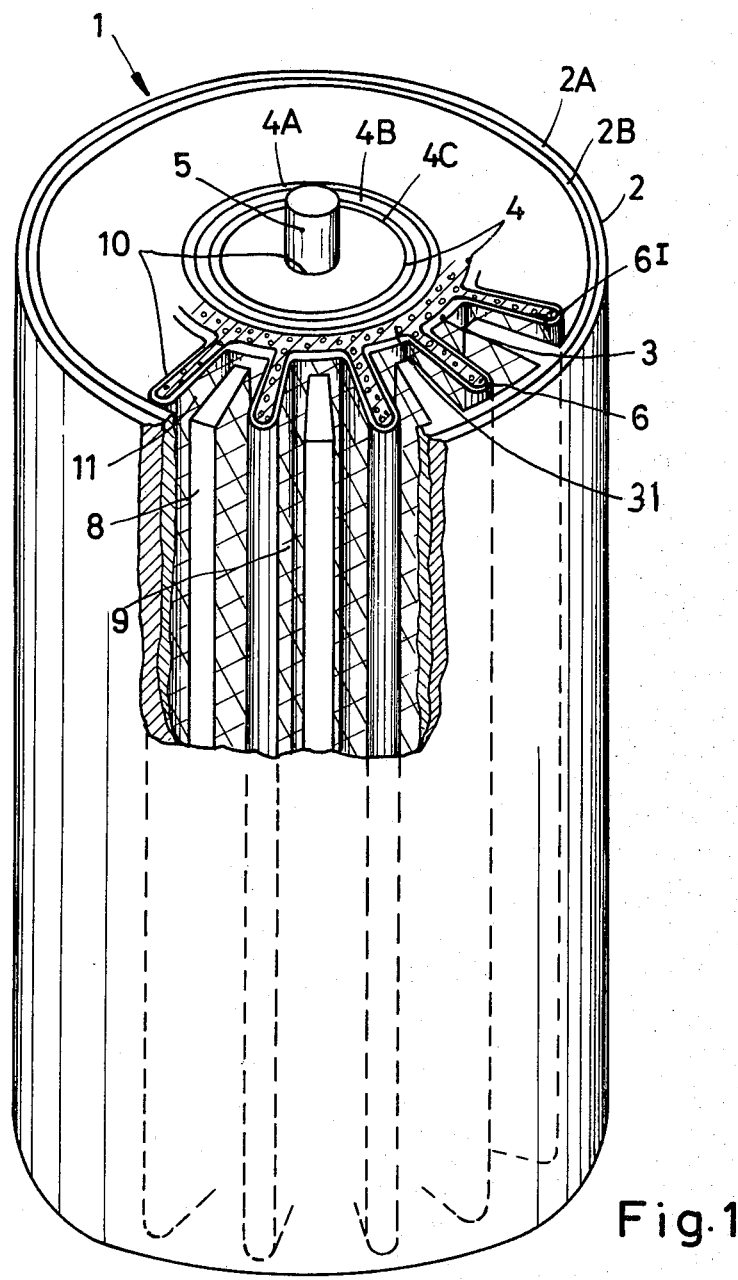
FIG. 1 diagrammatically illustrates an electrochemical storage cell in accordance with the invention with the housing partially cut away to better view the solid electrolyte with outward-pointing ribs, as well as current collectors disposed between adjacent ribs.

In a storage cell, in accordance with the invention, the solid electrolyte is provided with several recesses which are directed outward and are hollow on the inside and which are arranged at a definite distance from each other, and wherein at least one current collector is engaged between each two adjoining recesses. Each current collector which engages between two recesses, is connected in an electrically conducting manner to the metallic housing of the storage cell.

The solid electrolyte of the storage cell according to the invention, has a substantially cup-shaped form. Its cylinder surfaces are provided with outwardly directed recesses. In one embodiment of the storage cell, the recesses are designed as hollow narrow ribs. All recesses are directed radially outward. Each recess extends from an open vertical of the solid electrolyte along its entire outside surfaces back to an open end of the solid electrolyte. In another embodiment of the invention, the recesses are designed so that they become wider toward the outside and have a trapezoidal cross section.

The interiors of all recesses are in direct contact or communication with the interior of the solid electrolyte. In one embodiment of the storage cell, in which the interior of the solid electrolyte serves as the anode space, a safety insert is provided which is arranged within the solid electrolyte. The safety insert is cup-shaped and has at least one opening at its closed end which is arranged at a small distance from the closed end of the solid electrolyte. The interior of the safety insert is in communication with the inside spaces of the recesses via this opening. In this embodiment of the invention, the interiors of the recesses contain the smaller amount of sodium. The larger amount of sodium is in the interior of the safety insert which serves at the same time as a sodium supply space. The safety insert is formed by at least three stacked cups. The outside diameter of the inner cup is chosen so large that its exterior surfaces rest against the inside surfaces of the middle cup. The dimensions of the middle cup are likewise chosen so that its outside surfaces rest against the inside surfaces of the outer cup. The inner cup of the safety insert is preferably made of aluminum. Graphite is used for fabricating the middle cup. The outer cup of the safety insert can also be made of steel. The metallic housing which confines the storage cell is likewise cup-shaped. Preferably it consists of two stacked cups, with the inner one made of aluminum and the outer one of steel. The dimensions of the inner cup are chosen so that its outside surfaces rest against the inside surfaces of the outer cup. As mentioned above, the interior of the solid electrolyte serves as an anode space in the embodiment example described here, while the cathode space is arranged between the solid electrolyte and the metallic housing. Since the inner cup of the metallic housing is made of aluminum, its surfaces which come into contact with the catholyte substance are desirably provided with a conductive protective layer. Such a protective layer is also helpful when the anode space is arranged between the solid electrolyte and the metallic housing. The inner cup of the metal housing is additionally provided with radially arranged current collectors. These are aluminum sheet-metal parts which are likewise provided with a conducting protective layer. The aluminum sheets are arranged so that one sheet is disposed between two adjacent recesses of the solid electrolyte. A graphite felt impregnated with sulfur is placed between each recess of the solid electrolyte and current collector. The recesses of the solid electrolyte are filled on the inside, preferably with a capillary-active material. This ensures uniform transport of the sodium to the boundary surfaces of the recesses.

Due to the arrangement of the specifically designed safety insert within the solid electrolyte, the confluence of sodium and sulfur is prevented in the event of a break of the solid electrolyte or is delayed in time. By virtue of the special geometry of the solid electrolyte, the storage cell exhibits great power density despite the safety measures described above.

In a further embodiment of the invention, the interior of the solid electrolyte is made smaller than in the example described above. Its cylinder surfaces again have recesses which are here designed as hollow narrow ribs. The interior of the solid electrolyte serves as the anode space and is filled with sodium, while the cathode space is arranged between the solid electrolyte and the metal housing. No safety insert is provided in the interior of the solid electrolyte in this embodiment example. The interiors of the recesses, particularly the ribs, can hold or contain in this embodiment examples more sodium than the rest of the inside region of the solid electrolyte. The cell is closed off here by a disc of $\alpha$-aluminum oxide which closes off the anode and cathode space and is connected to the solid electrolyte and the metal housing. Above this disc, a supply container for sodium is connected to the anode space via one or several openings in the $\alpha$-aluminum disc.

In the embodiment of an inverted storage cell, the recesses of the solid electrolyte are shaped so that they become wider toward the outside and have a trapezoidal cross section. Between two respective adjoining recesses of the solid electrolyte, only a narrow rib-like empty space remains. The interior of the solid electrolyte serves as the cathode space, while the anode space is arranged between the solid electrolyte and the metallic housing. This storage cell is likewise closed off by a disc of $\alpha$-aluminum oxide which is connected to the solid electrolyte and the metal housing. The anode space is additionally connected via one or several openings to a supply container for the sodium. The supply container is arranged at one of the two ends of the storage cell. Preferably, the storage cell is likewise closed off by a disc of $\alpha$-aluminum oxide, above which a supply container is arranged which is in communication with the anode space via openings.

The invention will be explained in greater detail in the following. FIG. 1 shows the storage cell with a metallic housing 2, a solid electrolyte 3, a safety insert 4 and a current collector 5.

In the embodiment example shown here, the metallic housing is formed by two cups 2A and 2B which are placed one inside the other. The outer cup 2A is made of steel while the inner cup 2B is made of aluminum. Both cups have the same height. The dimensions of the inner cup 2B are chosen so that its outer surfaces rest against the inside surfaces of the outer cup 2A. The solid electrolyte 3 is arranged in the interior of the metallic housing 2. The electrolyte 3 has a shape substantially that of a cup, the cylinder surfaces of which are provided with radially outward pointing ribs 6. The solid electrolyte 3 is, preferably, provided with about 15 such ribs 6. The ribs 6 are hollow inside and open toward the interior of the solid electrolyte. Each rib 6 joins the electrolyte 3 and is brought from the upper open end of the solid electrolyte 3, along the entire outside surfaces, to the solid electrolyte 3 along which line the rib again joins the electrolyte 3.

The overall diameter of the solid electrolyte 3 with its ribs 6 is chosen so that only a small spacing of a few mm remains between the outer boundary of the ribs 6 and the metallic housing 2. In addition to the hollow ribs 6, the solid electrolyte 3 has a further second region which is located in its interior. The safety insert 4 is inserted into the interior of the solid electrolyte 3. The safety insert 4 is, likewise, a cup-shaped design and is arranged symmetrically with respect to the longitudinal axis of the solid electrolyte. Its closed-off end is a small distance from the closed end of the solid electrolyte 3. The safety insert 4 is formed in this embodiment example by three cups 4A, 4B and 4C which are inserted into each other.

The dimensions of the three cups 4A, 4B and 4C are chosen so that they are close together and there is no space between the individual cups. All three cups have the same height. This height is matched to the height of the solid electrolyte 3. The outside diameter of the safety insert 4 is chosen sufficiently large that only a narrow ring space 31 remains between its outer boundary surface and the inside of the cylinder surface forming the solid electrolyte 3. The width of this ring space 31 is maximally 0.5 to 2 mm. The safety insert 4 has at least one opening (not shown here) at its closed-off end. A valve (not shown) is preferably inserted into this opening. This valve, depending on the temperature, closes the opening and unblocks the opening. The valve is designed to close off the opening upon a rise of the temperature above the operating temperature of the storage cell. The interior of the safety insert 4 is filled with sodium. The same applies to the annular space 31 between the safety insert 4 and the solid electrolyte 3. The interiors 6I of the ribs 6, likewise, contain sodium. They are additionally filled with a capillary-active material. This brings about the uniform transport of the sodium to the inside surfaces of the ribs 6. The entire interior of the solid electrolyte 3, which also includes the interior of the safety insert 4, serves in this embodiment example of the storage cell as the anode space 10. A metal or graphite rod 5 extending into the interior of the safety insert 4, serves as the anodic current collector.

The annular space remaining between the metallic housing 2 and the solid electrolyte 3, which is divided by the ribs 6 into several regions which are partially separated from each other, serves as the cathode space 11. A current collector 8 is arranged within the cathode space 11 between two respective ribs 6. Collector 8 is formed by an aluminum sheet-metal part 8 which is connected with its longitudinal edge in an electrically conducting manner to the inner cup 2B of the metallic housing 2. The current collectors 8 are located between the ribs 6. Their dimensions are chosen so that they reach almost to the solid electrolyte 3. The length of the current collectors 8 corresponds approximately to the height of the cup-shaped housing 2. A graphite felt 9 impregnated with sulfur is arranged between each rib 6 and a current collector 8, completely filling the in between space. The metal housing 2 in this storage cell acts as the cathodic current collector.

The closure of the storage cell (not shown here) is formed by a disc of α-aluminum oxide. The latter is connected optionally, with the interposition of a seal, to the housing 2 and the solid electrolyte 3 in a force-locking manner. Above this disc, a supply container for sodium is arranged, not shown, which is bounded by a tube closed on one side. The tube is set with its opening against the α-aluminum oxide disc forming the closure and is connected thereto in a force-locking manner. If the tube consists of aluminum, the connection to the discs can be made using the thermo-compression method. The supply container is connected to the interior of the safety insert 4 by one or several openings. The anodic current collector 5 which protrudes into the interior of the safety insert 4, goes up through the supply container and extends on the outside several mm beyond the top of tubular supply container. The supply container for the sodium can also be dispensed with since the interior of the safety insert has a large volume, sufficient as the supply container for the sodium.

Figure 2:
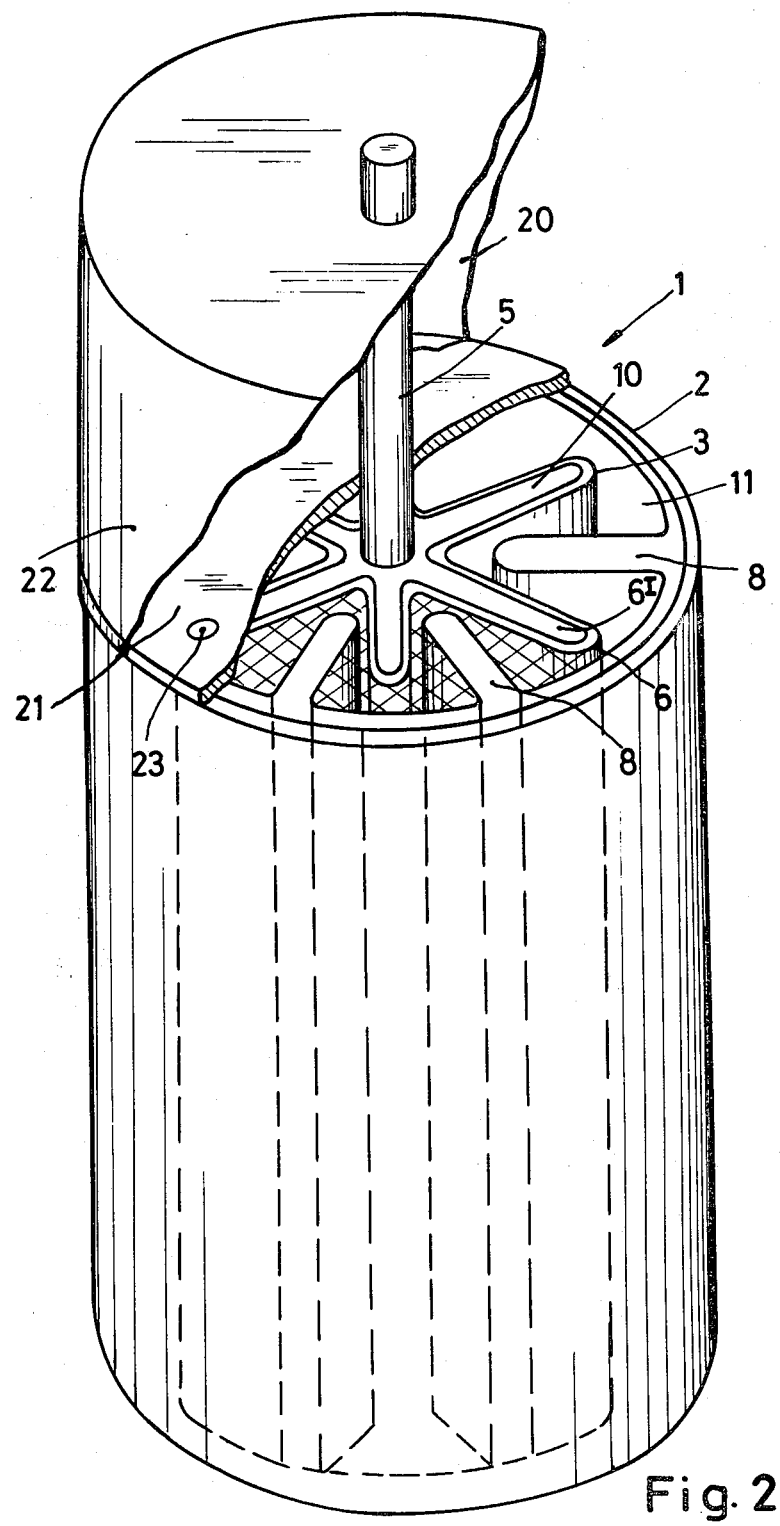
FIG. 2 is a variant of the storage cell shown in FIG. 1, in which the cross section of interior of the ribs is larger and the central area of the anode space smaller compared to that of FIG. 1.

FIG. 2 shows a variant of the storage cell shown in FIG. 1 and described above. The storage cell shown here corresponds designwise essentially to the storage cell shown in FIG. 1. The difference between the two storage cells 1 lies primarily in the geometry of the solid electrolyte 3. The solid electrolyte of FIG. 1, is arranged, as in the embodiment of FIG. 2, within a metal housing 2. The latter is again formed by two cups 2A and 2B. The outer cup 2A is made of steel and the inner cup 2B of aluminum. The dimensions of the inner cup are chosen so that its outside surfaces rest against the inside surfaces of the outer cup 2. Both cups are of the same height. Contrary to the solid electrolyte 3 of the embodiment example shown in FIG. 1, the solid electrolyte shown here has only a very small interior, while its ribs 6 are made substantially larger than the ribs 6 of the solid electrolyte 3 shown in FIG. 1. The ribs 6 are also hollow in FIG. 2 and are in communication with the interior of the solid electrolyte 3. A safety insert is not provided in this embodiment. The interior of the solid electrolyte 3 as well as the interiors 6I of the ribs 6 are filled with sodium. The interiors 6I of the ribs 6 are additionally filled with a capillary-active material. This reduces the capacity of the interiors 6I. However, it brings about a uniform transport of the sodium to the inner boundary surfaces of the ribs 6. The interior of the solid electrolyte 3 including the interiors 6I of the ribs 6 serve as the anode space 10.

The region between the housing 2 and the solid electrolyte 3 which is subdivided by ribs 6 of the solid electrolyte 3 into several subregions, serves as the cathode space. As in the case of the storage cell 1, shown in FIG. 1, current collectors 8 are provided here also. One current collector 8 each engages between two ribs 6 inside the cathode space 11. The current collectors 8 are made of aluminum metal and are fastened with their longitudinal edge to the inner cup 2B of the housing 2. The region between a rib 6 and a current collector 8 is filled with a graphite felt 9. This graphite felt 9 is saturated with sulfur. The storage cell 1 is closed-off by a disc 21 of α-aluminum oxide which seals the anode space 10 as well as the cathode space 11. A tube 22 which serves as the supply container 20 is closed on one side and disposed above the disc 21. The tube is set with its opening against the disc 21. The interior of the tube 22 is filled with sodium. The supply container for sodium is connected to the anode space 10 via one or several openings 23. An anodic collector 5 extends into the solid electrolyte 3. The former is formed by a metal or graphite rod 5. The letter goes through the storage container 20 and extends several mm beyond the latter to the outside.

Figure 3:
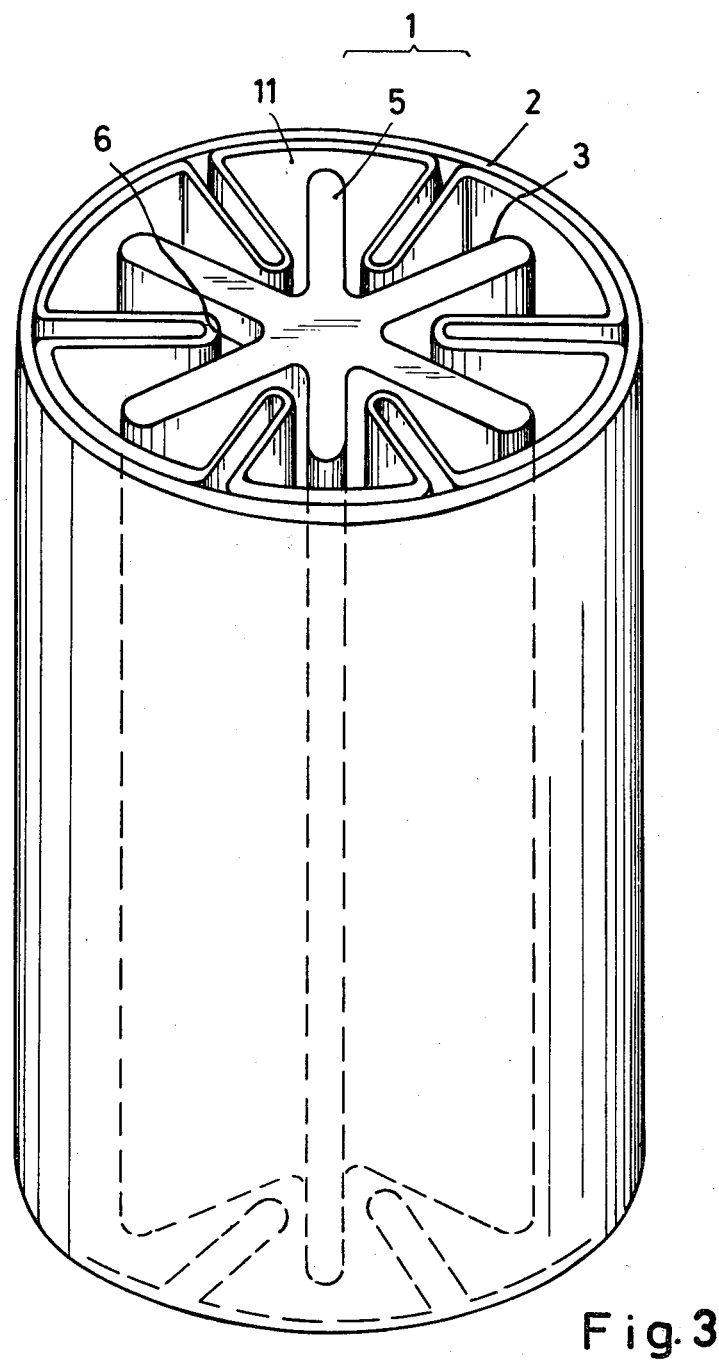
FIG. 3 is an inverted storage cell in which the cathode space is the interior of the solid electrolyte and the anode space is between the housing and the solid electrolyte.

FIG. 3 shows an inverted storage cell. In this embodiment, the space 10 in the interior of the solid electrolyte 3 is the cathode space. The annular space designated 11 between the metallic housing 2 and the solid electrolyte 3 serves as the anode space. The solid electrolyte 3 has essentially the shape of a cup. Its cylinder surfaces have recesses 6. The latter are designed so that they become wider toward the outside and have a trapezoidal cross section. Each recess 6 is directed radially outward and extends from the upper open end of the solid electrolyte 3 along its entire surface back to the solid electrolyte 3. Between two adjacent recesses 6, there remains only a gap-like space in which a current collector 8 engages. The current collectors 8 are designed in the same manner as the current collectors 8 of the embodiments described above. They are likewise connected to the metallic housing 2 in an electrically conducting manner.

The recesses 6 of the solid electrolyte 3 are also hollow on the inside in the embodiment shown here and are in communication with the interior of the solid electrolyte 3. The interior of the solid electrolyte 3 as well as the interiors 6I of the recesses 6 serve in the example described here as the cathode space. The cathode space is completely filled with a graphite felt which is saturated with sulfur. The cathodic current collector 5 extends into the solid electrolyte 3. The current collector 5 is formed by a metal rod which is provided with radially outward-pointing arms. The arms are formed by sheet metal parts which are connected with a longitudinal edge to the metal rod 5. The length of the arms is chosen slightly smaller than the height of the solid electrolyte 3. Their number depends on the number of recesses 6 with which the solid electrolyte 3 is provided. The arms are arranged so that one of them always extends far into a recess 6.

Between the metal housing 2 and the solid electrolyte 3 there remains a narrow annular space which has at most a width of 0.5 to 2 mm. Together with the gap-shaped spaces which are located between the recesses 6 and the solid electrolyte 3 it forms the anode space 10. The latter is filled with a capillary-active material and with sodium.

A disk of α-aluminum oxide with openings which can be closed off, is arranged above the anode space and the cathode space. The disc is connected to the housing 2 as well as to the solid electrolyte 3 in a force-locking manner. A supply container for sodium is arranged above it. The latter is confined by a tube which is connected on one side and is set with its opening against the disc of α-aluminum oxide. The tube is, likewise, connected to the disc in a force-locking manner. In the area of the anode space 10, the disc of α-aluminum oxide is provided with one or several openings through which the sodium can get from the supply container into the anode space. The capillary-active material filled into the anode space extends up to these openings. It ensures uniform transport of the sodium to the outside surfaces of the solid electrolyte 3.

We claim:

1. Electrochemical storage cell based on alkali metal and chalcogen comprising at least one anode space for the alkali metal anolyte and a cathode space for the chalcogen catholyte, with the anode, space and the cathode space separated from each other by an alkali ion-conducting solid electrolyte wall, a metallic housing bounding the cell, said solid electrolyte wall having a plurality of spaced, outwardly extending hollow recesses, and at least one current collector disposed between each pair of adjacent recesses.

2. Storage cell according to claim 1, wherein the current collectors between the recesses are connected to the metallic housing in an electrically conducting manner.

3. Storage cell according to claim 1, wherein the solid electrolyte is substantially cup-shaped.

4. Storage cell according to claim 3, wherein a safety insert is inserted into the interior of the solid electrolyte.

5. Storage cell according to claim 4, wherein the interior of of the safety insert is in communication via at least one opening with the interiors of the recesses.

6. Storage cell according to claim 4, wherein the safety insert is formed by at least three cups stacked inside each other.

7. Storage cell according to claim 6, wherein the outside surface of the inner cup rests against the interior surface of the middle cup.

8. Storage cell according to claim 6 or 7, wherein the outer surfaces of the middle cup rest against the inside surfaces of the outer cup.

9. Storage cell according to claim 6, wherein the inner cup of the safety insert is made of aluminum.

10. Storage cell according to claim 6 or 9, wherein the middle cup of the safety insert is made of graphite.

11. Storage cell according to claim 6 or 9, wherein the outer cup of the safety insert is made of steel.

12. Storage cell according to claim 1, wherein the interior of the solid electrolyte is in open communication with the interiors of the recesses.

13. Storage cell according to claim 12, wherein each recess is arranged from the open end of the solid electrolyte along its entire outside surface, back to the solid electrolyte.

14. Storage cell according to claim 1, wherein the recesses are hollow ribs.

15. Storage cell according to claim 1, wherein the recesses become wider toward the outside and have a trapezoidal cross section.

16. Storage cell according to claim 1, wherein the recesses point radially outward.

17. Storage cell according to claim 1, wherein the metallic housing is cup-shaped.

18. Storage cell according to claim 17, wherein the metallic housing is formed by two cups placed inside each other.

19. Storage cell according to claim 18, wherein the outer surfaces of the inner cup rest against the inner surfaces of the outer cup.

20. Storage cell according to claim 19, wherein the inner cup of the metal housing is made of aluminum.

21. Storage cell according to claim 20, wherein the outer cup of the metallic housing is made of steel.

22. Storage cell according to claim 20 or 21, wherein the inner cup of the housing has an electrically conducting protective layer.

23. Storage cell according to claim 4, wherein the safety insert has at least one opening in the bottom.

24. Storage cell according to claim 23, wherein the opening in the bottom of the safety insert has a valve adapted to close the opening.

25. Storage cell according to claim 18, wherein the inner cup of the metallic housing is connected to radially arranged sheet-aluminum parts serving as current collectors.

26. Storage cell according to claim 25, wherein the current collectors are provided with an electrically conducting protective layer.

27. Storage cell according to claim 1, wherein the anode space and the cathode space is closed off by a common disc of α-aluminum oxide, which is connected to the solid electrolyte and the housing.

28. Storage cell according to claim 27, wherein a sodium supply container is disposed above the disc.

29. Storage cell according to claim 28, wherein the supply container is a tube which is closed off on one side and is set with its opening against the disc.

30. Storage cell according to claim 29, wherein the tube has the same diameter as the housing.

31. Storage cell according to claim 29, wherein the anode space is connected to the supply container via at least one opening in the α-aluminum oxide disc.

* * * * *